US008814139B2

(12) United States Patent
Griffin et al.

(10) Patent No.: US 8,814,139 B2
(45) Date of Patent: Aug. 26, 2014

(54) ANTI-EXTRUSION PACKING SUPPORT

(75) Inventors: Daniel Griffin, North Olmsted, OH (US); Demetrius Lytle, Auburn Township, OH (US)

(73) Assignee: Swagelok Company, Solon, OH (US)

( * ) Notice: Subject to any disclaimer, the term of this patent is extended or adjusted under 35 U.S.C. 154(b) by 393 days.

(21) Appl. No.: 13/189,690

(22) Filed: Jul. 25, 2011

(65) Prior Publication Data

US 2012/0025119 A1  Feb. 2, 2012

Related U.S. Application Data

(60) Provisional application No. 61/369,199, filed on Jul. 30, 2010.

(51) Int. Cl.
*F16K 31/44* (2006.01)
(52) U.S. Cl.
USPC ....... 251/214; 251/315.01; 277/534; 277/584
(58) Field of Classification Search
USPC .......... 251/214, 315.01, 315.1; 277/510, 534, 277/584, 531
See application file for complete search history.

(56) References Cited

U.S. PATENT DOCUMENTS

| | | | |
|---|---|---|---|
| 3,445,087 A | 5/1969 | Priese et al. | |
| 3,586,289 A | 6/1971 | Priese | |
| 3,954,251 A | 5/1976 | Callahan, Jr. et al. | |
| 4,006,881 A * | 2/1977 | Gaillard | 251/214 |
| 4,177,998 A | 12/1979 | Laitkep et al. | |
| 4,273,148 A | 6/1981 | Charland | |
| 4,340,204 A | 7/1982 | Herd | |
| 4,394,023 A | 7/1983 | Hinojosa | |
| 4,440,404 A | 4/1984 | Roach et al. | |
| 4,451,047 A | 5/1984 | Herd et al. | |
| 4,462,568 A | 7/1984 | Taylor et al. | |
| 4,640,305 A * | 2/1987 | Johnson | 137/312 |
| 4,792,118 A * | 12/1988 | Yusko et al. | 251/315.01 |

(Continued)

FOREIGN PATENT DOCUMENTS

CN  201028109  2/2008

OTHER PUBLICATIONS

International Search Report and Written Opinion from PCT/US11/45146 dated Dec. 23, 2011.

*Primary Examiner* — John K Fristoe, Jr.
*Assistant Examiner* — Andrew J Rost
(74) *Attorney, Agent, or Firm* — Calfee, Halter & Griswold LLP

(57) ABSTRACT

A seal arrangement for providing a fluid seal of an annulus between two conforming surfaces such as a stem and a bore. The seal arrangement may include a pair of packing support rings. Preferably, two pairs of the packing support rings are used in order to provide double ended or two sided axial support for the packing. The first and second support rings support a load on the packing during normal or rated temperature use, with preferably an interference fit with the stem to resist extrusion of the packing along the stem. The support rings may be nested together and comprises different materials. For example, one support ring may comprise metal and the other support ring comprise a softer material such as a polymer or elastomer. An example of a packing material is a fire resistant material. The metal support ring may be used to maintain load on the fire resistant packing in the event that the other support ring has been destroyed by fire or other cataclysmic event.

20 Claims, 5 Drawing Sheets

(56) References Cited

U.S. PATENT DOCUMENTS

| | | | |
|---|---|---|---|
| 4,886,241 A * | 12/1989 | Davis et al. | 251/214 |
| 5,131,666 A | 7/1992 | Hutchens | |
| 5,469,887 A | 11/1995 | Smith, III | |
| 5,593,166 A | 1/1997 | Lovell et al. | |
| 5,791,629 A * | 8/1998 | Wears et al. | 251/214 |
| 5,927,685 A * | 7/1999 | Gosling | 251/214 |
| 6,095,493 A * | 8/2000 | Velan | 251/214 |
| 6,105,596 A * | 8/2000 | Hoyes et al. | 137/15.17 |
| 6,202,668 B1 | 3/2001 | Maki | |

* cited by examiner

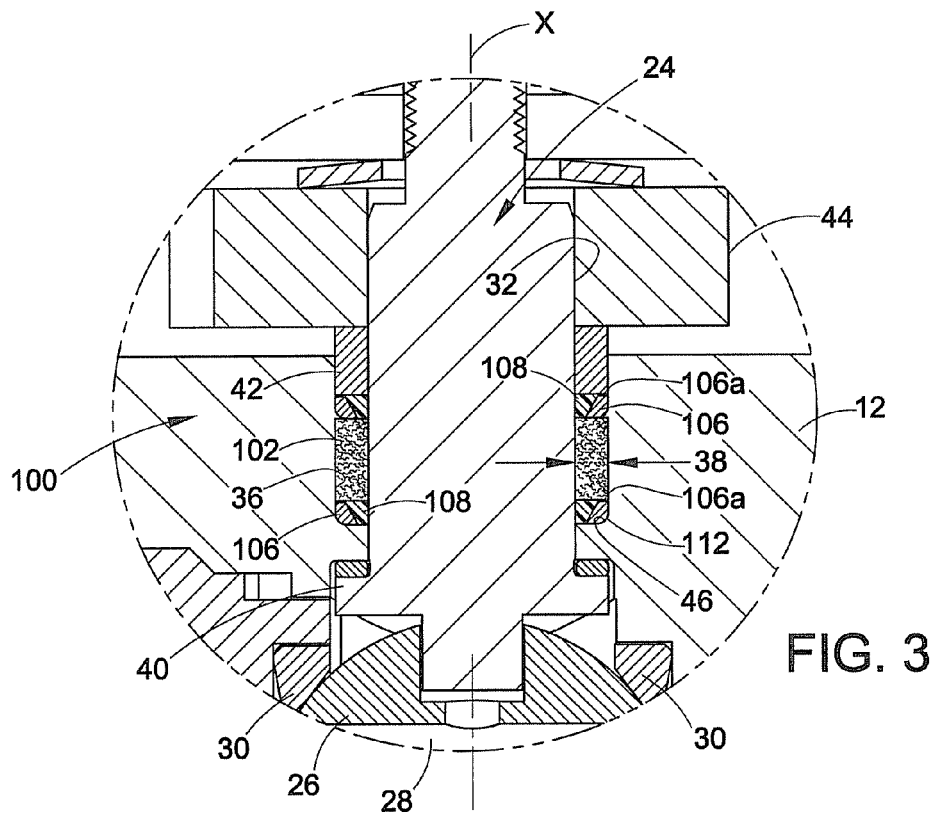
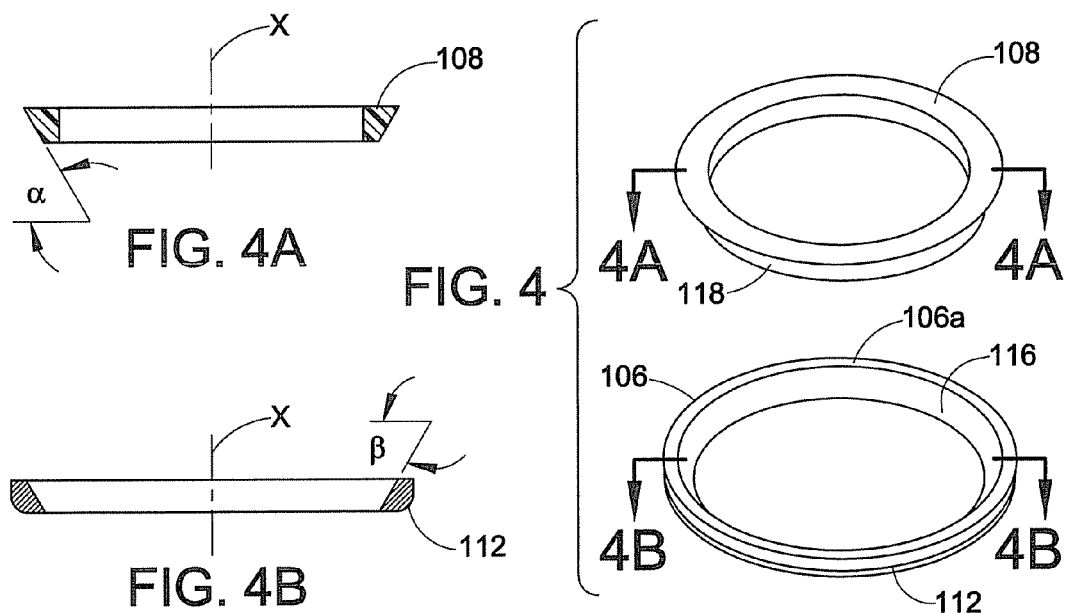
FIG. 3
FIG. 4A FIG. 4 FIG. 4B

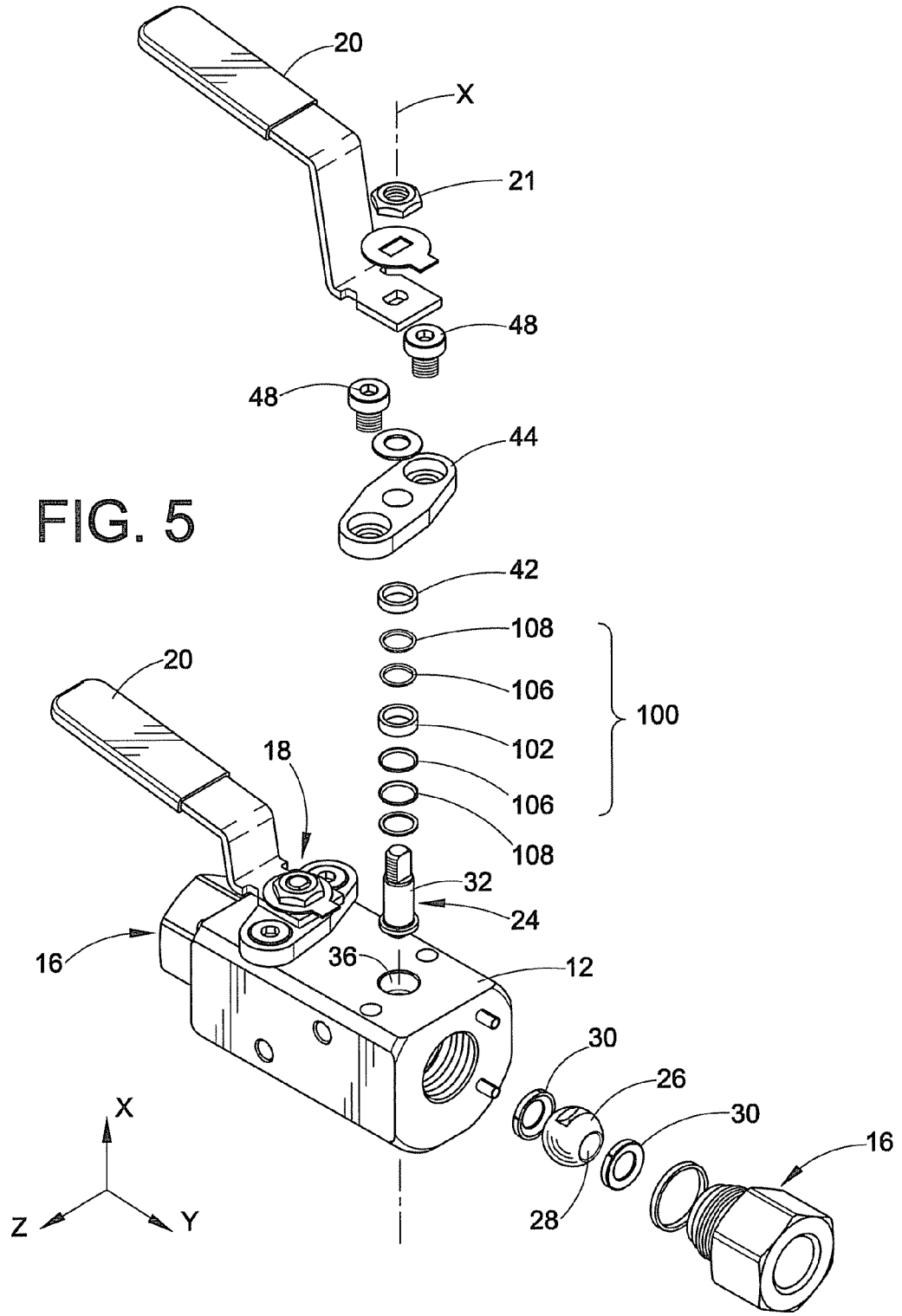

ANTI-EXTRUSION PACKING SUPPORT

RELATED APPLICATION

This application claims the benefit of U.S. Provisional patent application Ser. No. 61/369,199 for ANTI-EXTRUSION PACKING SUPPORT, filed on Jul. 30, 2010 the entire disclosure of which is fully incorporated herein by reference.

BACKGROUND OF THE DISCLOSURE

Flow control devices such as valves, for example, typically have a translatable or rotatable actuator stem that must be sealed against fluid system pressure. Other flow control devices may have one or more stems such as for end connectors that also must be sealed against fluid system pressure. The stem seals may be static or dynamic depending on whether a seal member engages a surface that slides or moves against a surface of the seal member. A stem seal must perform over a desired or rated operating range of the flow control device and at the desired or rated pressure. However, stem seals made of elastomeric material typically are limited in their temperature performance in order to maintain rated pressure, often due to extrusion and reduced compression or squeeze along the seal surfaces. Some applications also can impose very stringent requirements as to fugitive emissions.

SUMMARY OF THE DISCLOSURE

In accordance with an embodiment of one or more of the inventions described herein, a seal arrangement is provided for a fluid device of the type used to contain or control a fluid. The seal arrangement may be used with a component body that is disposed in a bore wherein a fluid seal is needed between a surface of the body and the bore. The body may be an annular, cylindrical or other shaped member, examples of which include but are not limited to actuator stems, connection stems and other stem-like members. The stem may rotate within the bore or may be axially translated within the bore or may be stationary in the bore. The seal arrangement may be used with a seal member or packing comprising a material that is susceptible to extrusion, for example, but not limited to materials such as elastomers and plastics and other materials or composites that are not all metal. In an exemplary embodiment, the seal member includes a fire resistant packing, for example, GRAFOIL™ brand all graphite material.

In an embodiment, the seal arrangement may include a pair of packing support rings. Preferably, two pairs of the packing support rings are used in order to provide double ended or two sided axial support for the packing. The first and second support rings support a load on the packing during normal or rated temperature use, with preferably an interference fit with the stem to resist extrusion of the packing along the stem. The second support ring supports a load on the packing even after a cataclysmic event such as a fire. The use of the anti-extrusion ring and metal backing ring achieves protection against packing extrusion so that the seal arrangement can meet even very stringent leak rate tests such as for fugitive emissions requirements, for example.

In an exemplary embodiment, the pair of packing support rings have complementary geometries to allow the support rings to nest axially together. The nesting may be realized with a tapered interface that can be used to provide a self-energized bias with a radial component of the packing against the stem. This can enhance the anti-extrusion benefits realized by use of the packing support rings. In a more specific embodiment, one of the support rings may comprise metal so as to survive a cataclysmic event such as a fire, while the other support ring may comprise a softer, more elastic material, for example but not limited to plastic, polymer or elastomeric, so as to resist extrusion of the packing along the stem surface.

In accordance with another embodiment of one of the inventions presented in this disclosure, a ball valve comprises a seal arrangement that prevents loss of fluid from the valve assembly along a stem. In an exemplary embodiment, a seal arrangement is provided that includes a stem seal member or packing that is high temperature resistant and in a specific embodiment fire resistant. A pair of packing support rings may be provided. The first support ring supports a load on the packing during normal or rated temperature use, with preferably an interference fit with the stem to resist extrusion of the packing along the stem. The second support ring supports a load on the packing even after a cataclysmic event such as a fire. In an exemplary embodiment, two pairs of the support rings may be used in order to provide double ended or two sided axial support for the packing. The support rings may be as described above. The seal arrangement may be incorporated into many different ball valve designs.

An anti-extrusion packing support in one embodiment may include a pair of packing support rings. One of the support rings may comprise metal or other rigid material and the other support ring may comprise a softer or more elastic material such as plastic, polymer or elastomer. In a more specific embodiment, the packing support rings may be nested axially together. Also, the pair of support rings may be stacked axially with one pair against one axial end of the packing and the other pair against another axial end of the packing.

The inventions will find application as well outside of the ball valve art, for example plug valves and needle valves, and in other applications that require seal against fluid pressure for a stem or stem-like member in a bore. The seal arrangement may provide a dynamic seal and/or a static seal against fluid pressure.

These and other embodiments of the inventions disclosed herein will be understood by those skilled in the art based on the following detailed description of the exemplary embodiments in view of the accompanying drawings.

BRIEF DESCRIPTION OF THE DRAWINGS

FIG. 3 is an enlarged illustration of a seal arrangement use in the exemplary embodiment of FIGS. 1 and 2, for the circled region of FIG. 2;

FIG. 4 illustrates exemplary embodiments of two packing support rings or members used in the embodiment of FIGS. 1-3, shown in exploded perspective;

FIG. 5 is an exploded perspective of one of the valve assemblies of FIG. 1; and

DESCRIPTION OF THE EXEMPLARY EMBODIMENTS

Figure 1:
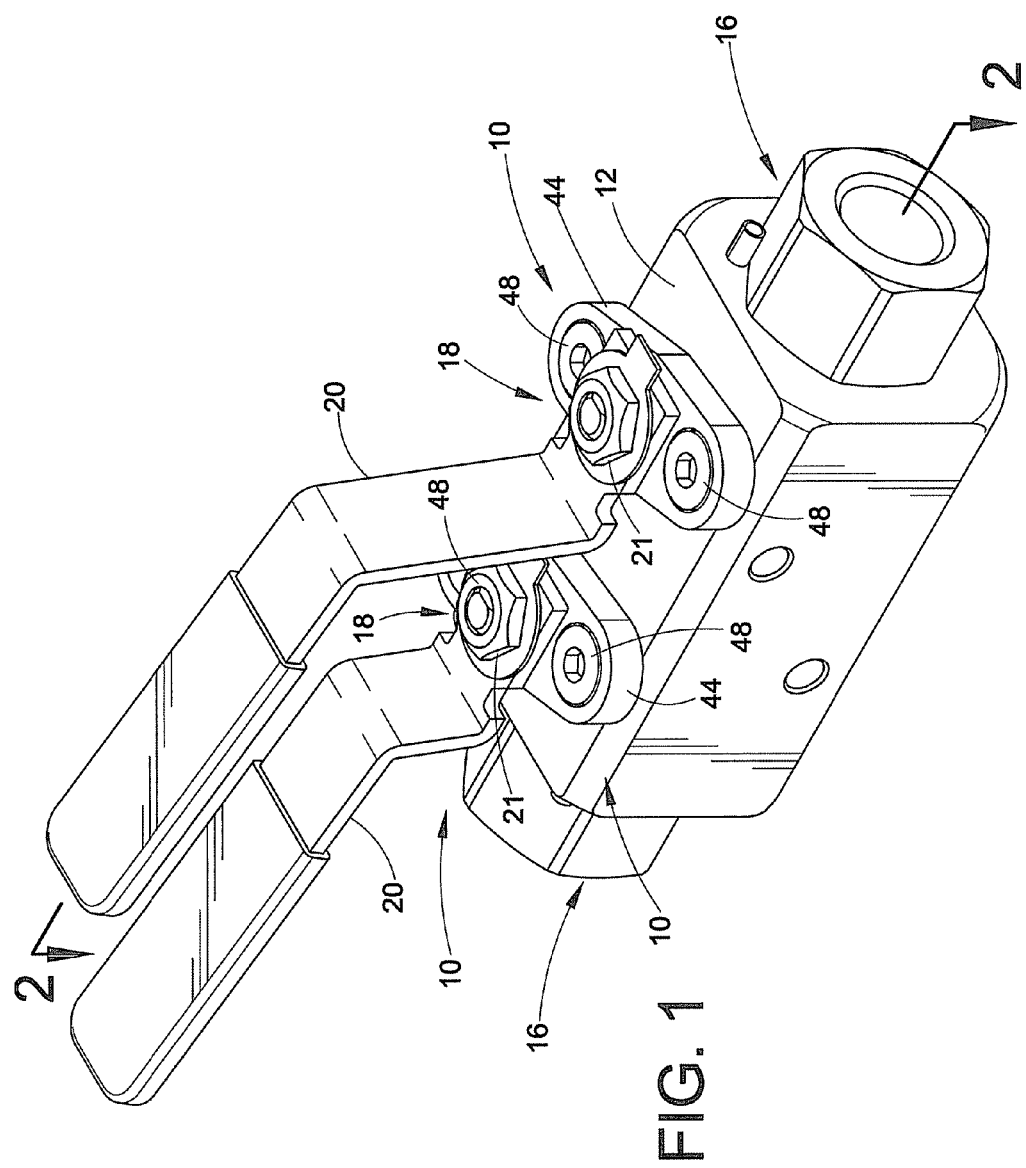
FIG. 1 is an embodiment of a ball valve application such as may be used with the present inventions, in perspective.

Although the exemplary embodiments herein are presented in the context of a ball valve, the inventions herein are not limited to such applications, and will find use with many different devices for containing fluid, for example, devices that contain fluid under pressure, and which may but need not also control flow of fluid, such as valves, regulators, restrictors, couplings and so on. For example, fluid connectors are well known in the art of fluid containment, and may be used to interconnect two or more fluid devices in a fluid circuit. Fluid connectors have many different designs and configurations, but most share the common feature of a body member having an annular or generally cylindrical body surface that is disposed in a bore, with the need for a seal arrangement between the body surface and the bore to prevent fluid flow through the annulus defined between the body surface and the bore wall. Fluid connectors may use the seal arrangement as a static seal or a dynamic seal or both. By a static seal is meant that the seal member is not necessarily exposed to or in direct contact with one or more surfaces that move relative to the engaging surface of the seal member. By a dynamic seal is meant that the seal member may be exposed to and in contact with a surface (for example, an actuator stem surface) against which it forms a seal, wherein that surface moves relative to the engaging surface of the seal member. The surface movement may be rotational, for example a ball valve stem, or translational, for example a plug or needle valve stem. The exemplary embodiments of a ball valve fluid device with a seal arrangement of the present inventions are but one example of many different designs that may be used, their number being far too numerous and varied to describe or illustrate herein. Moreover, for ball valve applications, the inventions also are not limited to use with a ball valve of the exemplary design illustrated herein.

Although the exemplary embodiments illustrate body members such as stem members that are generally cylindrical or have generally cylindrical surfaces disposed in generally cylindrical bores, it is contemplated that there may be applications in which a non-cylindrical stem or body member, for example an elliptical or oval stem or other contour or profile, may be disposed in a complementary bore and may utilize the seal arrangement concepts of one or more of the inventions herein.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

Figure 2:
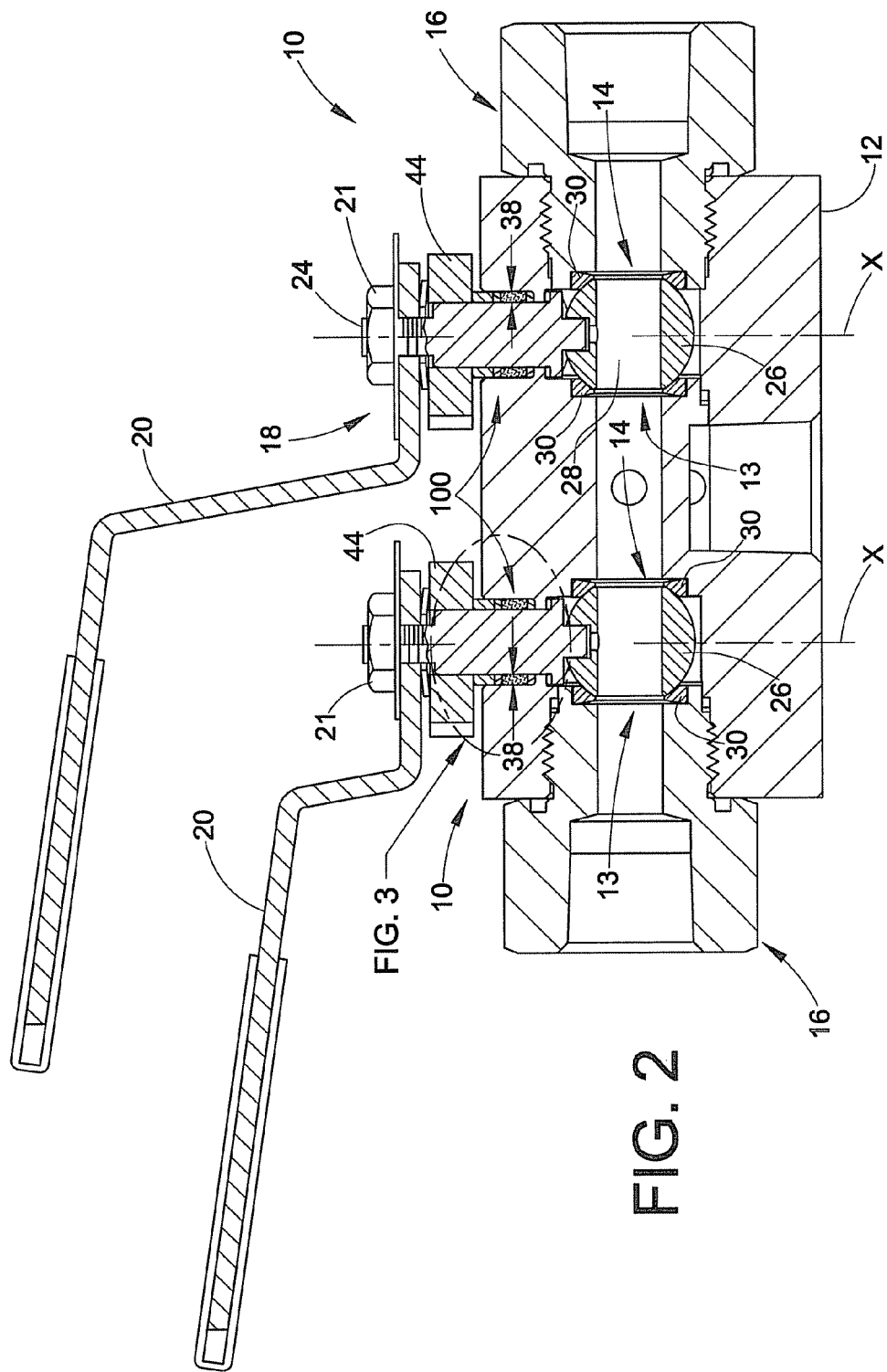
FIG. 2 is a longitudinal cross-section of the assembly of FIG. 1 taken along the line 2-2 in FIG. 1.

With reference to FIGS. 1 and 2, a first embodiment of one or more of the inventions is presented. In this embodiment, a fluid device 10 is illustrated that may be realized in the form of a ball valve, but many different types of fluid devices may be used as noted hereinabove, including fluid devices that do not necessarily control fluid flow. The ball valve 10 design forms no part of the present inventions other than the stem seal arrangement. Therefore, the ball valve 10 design will only be briefly reviewed herein, it being understood by those of ordinary skill in the art that many different ball valve designs may be used, including those presently known or later developed. In the particular example of FIGS. 1 and 2, there are two ball valves 10 that share a single valve body 12 as part of a double block and bleed configuration, however, this is only an exemplary application. The inventions may alternatively be used in single valve applications, other valve applications and in non-valve applications as needed.

The ball valve 10 may include the valve body 12 that contains the basic valve elements. A first fluid port 13 and a second fluid port 14 provide flow ports for fluid flow through the ball valve 10. Each fluid port 13, 14 may be an inlet or an outlet, and alternatively the ball valve 10 may have more than two fluid ports. Each fluid port 13, 14 may be in fluid communication with an end connection 16 that may be used to install the ball valve 10 in a fluid line or system (not shown). The end connections 16 need not be the same.

The valve body 12 also may support a valve actuator assembly 18. In the exemplary embodiments herein, the ball valve 10 is manually actuated by means of a handle 20 or similar functioning device. Alternatively, the ball valve 10 may have a non-manual or automatic actuating device (not shown) such as an electromechanical actuator, hydraulic actuator or pneumatic actuator as is well known. The actuator assembly 18 may be securely mounted to the valve body 12 by any suitable means, for example, a threaded nut 21.

With reference to FIGS. 2 and 5, the handle 20, or alternatively another actuating device, is coupled to an actuator stem 24. An actuator stem is typically, although need not be, a generally cylindrical member that extends along a longitudinal axis X, and is supported within the valve body 12 so as to be rotatable about the axis X to open and close the valve, or to otherwise adjust fluid flow through the valve. In the case of a ball valve 10, for example, the actuator stem 24 may be coupled to a ball valve element 26. The ball valve element 26 may have a fluid through bore 28 which, when the through bore 28 is generally aligned with the fluid ports 13, 14 allows fluid flow therebetween. The ball valve 10 in FIG. 2 is illustrated in the fully open position. Seat seals 30 are commonly used to seal against fluid pressure when the ball valve 10 is closed, such as for example, when the actuating device (for example the handle 20 for a manual valve) rotates the ball valve element 26 about the axis X about ninety degrees from the position illustrated in FIG. 2. The seat seals 30 may optionally be pressed against the ball valve element 26, for example, by means of seat seal carriers and springs (not shown).

All references herein to "axial" and "radial" are with respect to the X axis unless otherwise noted herein. Reference herein to rotational movement and translational movement associated with dynamic sealing are also referenced to the X axis unless otherwise noted. Additionally, although the exemplary embodiments are described herein in terms of an actuator stem, the inventions are equally applicable to any component surface that fits within a bore wall to require a seal (static or dynamic) against fluid pressure, with the exemplary component surface being realized in the form of a generally cylindrical body disposed in a generally cylindrical bore. A stem is but one example of such a body but it should be understood that the inventions will find application beyond those uses that might commonly be known or understood as constituting a stem.

Various seals are provided about the ball valve element 26 to prevent loss of system fluid (the term system fluid herein refers to the fluid that is contained and controlled by the fluid device 10, including but not limited to gasses or liquids). However, it is commonly desired to also provide a seal arrangement to prevent system fluid or system media from escaping into the actuator assembly 18 or to the ambient environment. An actuator stem, such as the actuator stem 24 herein, extends through an actuator stem bore 36 (FIG. 3) in the valve body. This stem bore 36, along with the outer surface 32 of the actuator stem 24, define an annulus or annular space 38 that is sealed against fluid loss by a seal arrangement 100. It is the seal arrangement 100 that is the subject of the present inventions, whether the seal arrangement is used for an actuator stem or other stem or stem-like member, or other body disposed in a bore, and whether used as a static seal or a dynamic seal.

Turning to FIG. 3, an embodiment of a seal arrangement 100 in accordance with one or more of the inventions herein is illustrated. FIG. 3 is an enlarged view of the circled portion of FIG. 2. An actuator stem 24, such as may be used for example for a ball valve or other fluid device, may have a very simple profile, such as a generally cylindrical shape, or may have a number of features depending on the overall ball valve design, actuator design and seal requirements. Therefore, an actuator stem 24 may have a number of recesses, slots, grooves and so on. Usually, a stem seal is disposed in an annular space 38 such that the seal arrangement is compressed radially between a surrounding surface such as the surface of the stem bore 36 and an outer surface 32 of the actuator stem 24.

In the embodiment of FIGS. 2 and 3 then, the actuator stem 24 may have a radially outer surface 32 which may or may not be an outer surface of greatest diameter of the actuator stem 24. For example, in FIG. 3 it will be noted that a lower end 40 of the actuator stem 24 may have a larger diameter than the outer surface 32. The outer surface 32 closely fits within the actuator stem bore 36 and presents a stem seal surface facing the surface of the stem bore 36.

The seal arrangement 100 in this exemplary embodiment includes a packing member 102 and two pairs of support rings described below. The packing may be made of any suitable material that is compatible with the system fluid, and in a particular example the packing 102 may be but need not be fire resistant. An example of a fire resistant material is an all graphite based packing, for example, a GRAFOIL™ brand packing material. This type of material may be used, for example, for valves that will need to maintain a seal against pressure even if a catastrophic event such as a fire occurs. The inventions herein, however, may be used with packings made of non-fire resistant materials.

In order to contain system pressure and prevent loss of system fluid, it is important to maintain adequate compression of the packing 102 within the annular space 38 so as to maintain a tight radial compression between the packing 102 and the stem 24. To this end, known load applying members are usually used with a packing to try to maintain a compressive load on the packing which also is intended to maintain a radial load of the packing against both the stem surface 32 and the bore surface 36. However, many packings, including graphite type fire resistant packings, tend to extrude along the stem wall during temperature cycling. These and other packings also are susceptible to extrusion during mechanical cycling, for example at dynamic seal locations along the stem 24. Such can be the case with prior seal arrangements even if a live load is applied to the packing 102. Extrusion of the packing 102 may result in a reduction of the compressive load of the packing 102 against the stem 24 and thus a loss of seal integrity.

In the exemplary embodiment herein, a compression or axial load ring, such as a metal ring 42, may be used to apply an axial load to the seal arrangement 100 so as compress the packing 102 tightly against the stem surface 32. The load can be applied by means of a bolted flange 44 that is secured to the valve body 12 using bolts 48 (see FIG. 5). The compression metal ring 42 may alternatively be made integral with the flange 44. See FIG. 6 for another alternative means to apply a load to the seal arrangement 100.

In order to reduce extrusion during temperature and/or mechanical cycling, optionally to reduce friction and galling, and also optionally to provide resistance to total seal loss after a fire, we provide two pairs of first and second support rings 106, 108. These support rings 106, 108 provide an anti-extrusion packing support. Each pair is preferably although not necessarily disposed adjacent and in direct contact with a respective axial end of the packing 102. These support rings 106, 108 may be axially stacked on either side of the packing 102. As further described below, optionally the support rings 106, 108 may be nested together. The support rings preferably are circumferentially continuous annular rings, not split rings.

The first or outer support ring 106 preferably is made of a strong rigid material such as metal for example that exhibits low elasticity. For applications in which the fluid component such as the ball valve 10 must survive a catastrophic event such as a fire, preferably the outer support ring 106 comprises a high temperature resistant material, for example, a metal ring such as made from stainless steel may be used. Other suitable materials may be used, for example ceramics. The outer ring 106 may optionally include a shaped or profiled lower end 112 that conforms to the shape of a recess shoulder 46 of the valve body 12. It is preferred that the outer support ring 106 not contact the actuator stem 24, thereby eliminating any opportunity for galling or other increased friction contact.

The second or inner support ring 108 (also referred to herein as an anti-extrusion ring) is intended to have a close fit with the outer surface 32 of the stem body 24. Preferably the close fit may be an interference fit. This interference fit will reduce and in many cases eliminate extrusion of the adjacent packing 102 along the outer surface of the stem 24 during mechanical and/or temperature cycling. Because of the interference fit, it is expected that the seal arrangement 100 will be sufficiently loaded to radially compress the inner support rings 108 against the wall 32 of the stem. It is further preferred that the inner support rings 108 comprise a material that will not gall or increase friction against the stem 24, and furthermore will be stable over the rated or normal temperature range of the valve. One suitable material is a PEEK™ brand plastic, however, many other plastics, polymers and elastomers are available, with the choice of material being a function among other things of the normal or rated temperature range of the fluid device, the amount of torque allowed for operating the actuator, compatibility of the material with system media, and so on. By using a plastic or polymer such as PEEK™, there will be less friction with the actuator stem 24 and so the compressed support ring 108 should not significantly add to the torque needed to rotate the actuator handle 20. However, in some applications there may be soft metals or other non-plastic materials that can be low friction but provide adequate protection against extrusion.

In this exemplary embodiment, the second or inner support rings 108 may be designed to have an interference fit with the exterior surface 32 of the stem 24 even before the seal arrangement 100 is loaded by the assembled bolted flange 44. The applied load during assembly will enhance this tight compression fit between the support rings 106 and the stem 24.

It will be noted that in this example of a ball valve actuator, the seal arrangement 100 includes a static seal portion and a dynamic seal portion. The dynamic seal is provided between the inner support ring 108 and the stem 24 when the stem is rotated, and the static seal is provided between the outer support ring 106 and the stem bore 36 in the valve body 12 by controlling and preferably minimizing the clearance between them. The inner support ring 108 may also contribute to the static seal for the valve body 12 although the inner support ring 108 does not directly contact the valve body 12. Potential extrusion of the packing 102 between the outer support ring 106 and the stem bore 36 can be minimized or prevented without the need for a softer material ring because this seal location is a static seal. However, the dynamic seal about the rotatable stem is more challenging and benefits from the softer seal 108 because the stem 24 may have normal imperfections such as being slightly out of round or otherwise can present an imperfect seal surface 32.

In the example of a ball valve 10 that is to withstand a catastrophic event such as a fire, it will be expected that the plastic or polymer inner support rings 108 will melt away. However, by providing the outer support ring 106, adequate load can be maintained on the packing 102 so that a seal can be maintained even after a cataclysm such as a fire. Note from FIG. 3 that each metal outer support ring 106 includes a surface 106a that is in direct contact with a portion of the packing 102 to maintain load against the packing 102 even if the inner support rings 108 are gone. The outer support ring 106 in the support ring pair positioned above the packing 102 (as viewed in FIG. 3) also is in direct contact with the load applying metal ring 42. It may be that in some cases the leak rates of the packing 102 with only the surviving outer support rings 106 will be higher than when the inner non-metal support rings 108 are also present, because most valves are not expected to survive a fire without some decrease in seal integrity. The remaining metal outer support rings 106 can maintain load on the packing 102 so that there will still be a seal against fluid pressure.

In the exemplary embodiment herein, each pair of the support rings 106, 108 may optionally include a tapered interface, for example, in the form of complementary engaging tapered surfaces 116, 118 respectively (FIGS. 4A and 4B) to provide the tapered interface between the nested rings 106, 108. For the inner support ring 108, the outer surface 118 may taper at an angle $\alpha$, and for the outer support ring 106 the inner surface 116 may taper at an angle $\beta$. These angles may be the same or different from each other, and in one exemplary embodiment we have found that approximately sixty degrees for both $\alpha$ and $\beta$ works well. This tapered interface between the inner and outer support rings 106, 108 helps assure a consistent self-energized load on the two support rings 106, 108 to further assure good radial loading of the inner support rings 108 against the stem 24. With the angles $\alpha$ and $\beta$ preferably being about equal, the support rings 106, 108 may closely nest together. However, the nested arrangement may be realized with many different alternative shapes and profiles for the interface between the two support rings 106, 108.

While the exemplary embodiment herein will find use with applications involving fire resistant seal arrangements, we further note that the inventions are advantageous as well for addressing fugitive emissions requirements under normal operation and environments. In particular, by reducing or preventing packing extrusion over the rated operating temperature and pressure ranges of the flow device, the two ring design greatly improves the leak rate performance of the seal mechanism 100. As an example, the seal arrangement 100 addresses fugitive emissions requirements for Class A and Class B ISO (International Standards Organization) maximum leak rates for a stem of about one-half inch in diameter. These leak rates respectively are $1.7\times10^{-6}$ and $1.7\times10^{-5}$ cubic centimeters per minute, using a test protocol of helium at 6250 psi during temperature cycling between $-50°$ C. to $150°$ C., with an external sniffer to detect for helium leakage around the stem while the stem is rotating.

Figure 6:
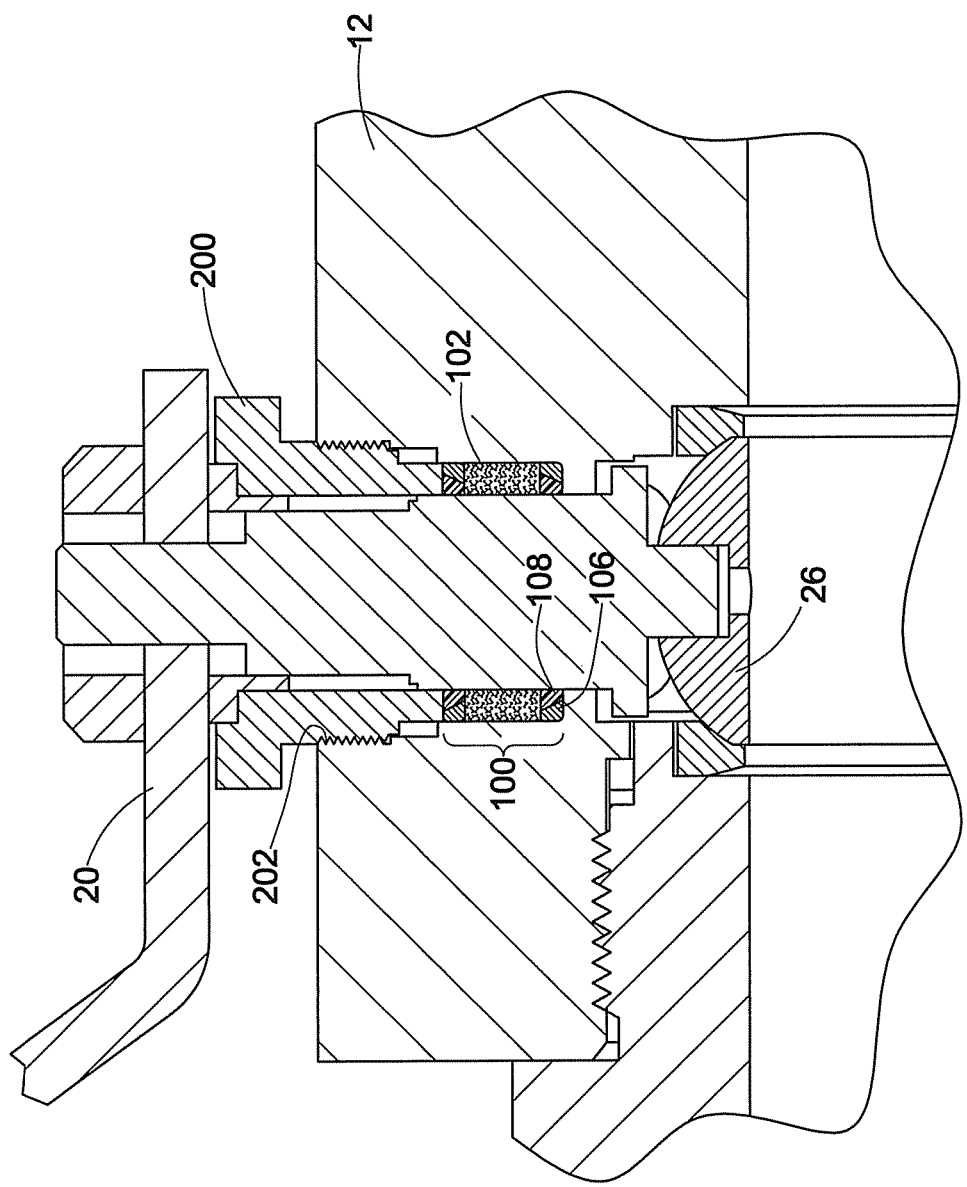
FIG. 6 illustrates another embodiment for applying a load to the seal arrangement of FIG. 1.

With reference to FIGS. 3 and 6, it should further be noted that the two pairs of support rings 106, 108 are installed in the same orientation with the inner ring 108 up as viewed in the drawings. Alternatively, the ring pairs may be installed in a mirror-like fashion so that, for example, the lower pair may have the inner and outer support rings 108, 106 flipped to increase the surface area of the outer ring 106 that contacts and supports the packing 102 should the inner ring be missing.

We thus provide a seal arrangement 100 for sealing an annulus between two conforming surfaces, for example, concentric surfaces, that uses one or more packings 102. The seal arrangement 100 may include a first support ring 106 comprising a strong or rigid material such as a metal for example, and a second support ring 108 comprising a softer more elastic material, preferably also having low friction, to resist extrusion of the packing 102. The support rings 106, 108 preferably closely nest together or have good surface to surface contact in order to facilitate a self-energized load of the second support ring 108 against a surface. In one embodiment, the second support ring may be used for normal environments to reduce or eliminate extrusion of the packing material, while not contributing to galling or an increase in actuator torque for dynamic seal applications. In another embodiment, the packing 102 may comprise a fire resistant material that may tend to exhibit extrusion, the first support ring 106 comprises a high temperature resistant material such as metal that will withstand a fire so as to maintain a post-fire load on the packing, and the second support ring 108 may comprise a material such as a plastic or polymer, for example, PEEK™ to prevent extrusion during normal use. These seal arrangements may be used in static seal applications as well as dynamic seal applications.

With reference to FIG. 6 we illustrate an alternative embodiment. In this example, all parts may be the same as the first embodiment except as noted. Rather than use the bolted flange 44 and separate metal ring 42, we can use a male threaded nut or screwed bonnet nut 200 that threadably mates to a threaded bore 202 in the valve body 12. This screwed bonnet 200 is thus used to apply the load to the packing 102 and the seal arrangement 100 during final valve assembly.

The inventive aspects have been described with reference to the exemplary embodiments. Modification and alterations will occur to others upon a reading and understanding of this specification. It is intended to include all such modifications and alterations insofar as they come within the scope of the appended claims or the equivalents thereof.

We claim:

1. A stem seal for a fluid containing device of the type having a stem disposed in a bore, the seal arrangement comprising:
   a stem comprising an outer surface and a bore comprising an inner surface, said stem being sized to be received within said bore, said bore inner surface being complementary shaped to said stem outer surface,
   a packing disposed about a portion of said stem outer surface, said packing providing a fluid seal for an annulus between said stem outer surface and said bore inner surface,
   a first pair of support rings disposed adjacent a first axial end of said packing and a second pair of support rings disposed adjacent a second axial end of said packing,
   each said pair of support rings comprising a metal ring for applying a compressive load on said packing and an anti-extrusion ring being in radial compression against said stem outer surface and that resists extrusion of said packing
   said metal ring of said first pair of support rings being in direct contact with said first axial end of said packing and said metal ring of said second pair of support rings being in direct contact with said second axial end of said packing.

2. The stem seal of claim 1 wherein each said anti-extrusion ring comprises a softer material than said metal rings and said softer material is chosen from the group of: polymers, elastomers, plastics.

3. The stem seal of claim 2 wherein each said metal ring comprises a material that survives a fire so that said packing is under compression after exposure to a temperature that melts said anti-extrusion rings.

4. The stem seal of claim 1 wherein each said anti-extrusion ring has an interference fit with said outer surface of said stem.

5. The stem seal of claim 1 wherein each said pair of support rings are axially nested with each other.

6. The stem seal of claim 5 wherein said pair of support rings comprise engaging tapered surfaces.

7. The stem seal of claim 1 wherein said support rings are axially stacked against axial ends of said packing.

8. The stem seal of claim 1 wherein said packing comprises a fire resistant graphite material.

9. The stem seal of claim 1 wherein said anti-extrusion ring comprises a reduced friction plastic, polymer or elastomer so as to resist galling said stem outer surface.

10. The stem seal of claim 1 wherein said fluid containing device comprises a ball valve.

11. The stem seal of claim 1 comprising a compression ring that contacts one of said pair of support rings to apply an axial load to said packing.

12. A fire resistant valve of the type having a valve stem disposed in a bore and a seal arrangement comprising:
    a stem comprising an outer surface and a bore comprising an inner surface, said stem being sized to be received within said bore, said bore inner surface being complementary shaped to said stem outer surface,
    a fire resistant packing disposed about a portion of said stem outer surface, said fire resistant packing providing a fluid seal for an annulus between said stem outer surface and said bore inner surface,
    a first pair of support rings disposed adjacent a first axial end of said fire resistant packing and a second pair of support rings disposed adjacent a second axial end of said fire resistant packing,
    each said pair of support rings comprising a first ring for applying a compressive load on said fire resistant packing and an anti-extrusion ring being in radial compression against said stem outer surface and that resists extrusion of said fire resistant packing, said first ring comprising a first material of metal and said anti-extrusion ring comprising a second material that is different from said first material,
    said metal ring of said first pair of support rings being in direct contact with said first axial end of said packing and said metal ring of said second pair of support rings being in direct contact with said second axial end of said packing.

13. The fire resistant valve of claim 12 wherein said first material allows said first ring to apply a load to said fire resistant packing after a fire.

14. The fire resistant valve of claim 12 wherein said metal comprises stainless steel.

15. The fire resistant valve of claim 12 wherein said anti-extrusion ring comprises material selected from: polymer, plastic, elastomer.

16. The fire resistant valve of claim 12 wherein each said anti-extrusion ring has an interference fit with said outer surface of said stem.

17. The fire resistant valve of claim 12 wherein each said pair of support rings are axially nested with each other.

18. The fire resistant valve of claim 17 wherein each said pair of support rings comprise engaging tapered surfaces.

19. The fire resistant valve of claim 12 wherein each said pair of support rings are axially stacked against axial ends of said packing.

20. The fire resistant valve of claim 12 comprising a compression ring that contacts one of said pair of support rings to apply an axial load to said packing.

* * * * *